(12) United States Patent
Freeman et al.

(10) Patent No.: US 6,353,069 B1
(45) Date of Patent: Mar. 5, 2002

(54) HIGH REFRACTIVE INDEX OPHTHALMIC DEVICE MATERIALS

(75) Inventors: Charles Freeman, Arlington; David L. Jinkerson, Benbrook; Mutlu Karakelle; Albert R. Leboeuf, both of Fort Worth, all of TX (US)

(73) Assignee: Alcon Manufacturing, Ltd., Fort Worth, TX (US)

( * ) Notice: Subject to any disclaimer, the term of this patent is extended or adjusted under 35 U.S.C. 154(b) by 0 days.

(21) Appl. No.: 09/536,083

(22) Filed: Mar. 24, 2000

Related U.S. Application Data

(63) Continuation-in-part of application No. 09/283,671, filed on Apr. 1, 1999, now abandoned.
(60) Provisional application No. 60/081,814, filed on Apr. 15, 1998.

(51) Int. Cl.$^7$ .............................. A61F 2/16; C08F 118/02
(52) U.S. Cl. ..................... 526/319; 526/307.5; 526/323; 526/323.1; 526/323.2; 526/326; 526/328.5; 623/6.11
(58) Field of Search ............................ 623/6; 526/292.1, 526/259, 292.3, 292.5, 292.6, 294, 296, 307.5, 323, 323.1, 323.2, 326, 328.5, 319

(56) References Cited

U.S. PATENT DOCUMENTS

| | | | |
|---|---|---|---|
| 4,304,895 A | 12/1981 | Loshaek | 526/313 |
| 4,528,311 A | 7/1985 | Beard et al. | 524/91 |
| 4,573,998 A | 3/1986 | Mazzocco | 623/6 |
| 4,619,657 A | 10/1986 | Keates et al. | 623/6 |
| 4,619,662 A | 10/1986 | Juergens, Jr. | 623/6 |
| 5,290,892 A | 3/1994 | Namdaran et al. | 526/259 |
| 5,331,073 A | 7/1994 | Weinschenk, III et al. | 526/264 |
| 5,433,746 A | 7/1995 | Namdaran et al. | 623/6 |
| 5,470,932 A | 11/1995 | Jinkerson | 526/312 |
| 5,674,960 A | 10/1997 | Namdaran et al. | 526/259 |
| 5,861,031 A | 1/1999 | Namdaran et al. | 623/6 |

FOREIGN PATENT DOCUMENTS

| | | |
|---|---|---|
| EP | 0 485 197 A1 | 5/1992 |
| EP | 0 898 972 A2 | 3/1999 |
| WO | WO 97/24382 | 8/1997 |

Primary Examiner—David W. Wu
Assistant Examiner—Tanya Zalukaeva
(74) Attorney, Agent, or Firm—Patrick M. Ryan

(57) ABSTRACT

High refractive index copolymers suitable for use in ophthalmic devices are disclosed. The copolymers comprise a) two or more monomers of the structure:

(I)

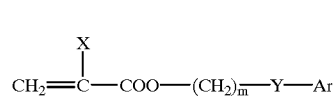

wherein: X is H or $CH_3$;

m is 0–10;

Y is nothing, O, S, or NR wherein R is H, $CH_3$, $C_nH_{2n+1}$ (n=1–10), iso-$OC_3H_7$, $C_6H_5$, or $CH_2C_6H_5$;

Ar is any aromatic ring which can be unsubstituted or substituted with H, $CH_3$, $C_2H_5$, n-$C_3H_7$, iso-$C_3H_7$, $OCH_3$, $C_6H_{11}$, Cl, Br, $C_6H_5$, or $CH_2C_6H_5$;

a crosslinking monomer having a plurality of polymerizable ethylenically unsaturated groups, and b) a total of about 5 mole % or less of one or more monomers of the structure:

(II)

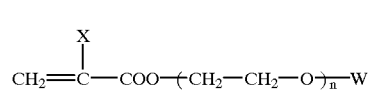

wherein: X is H or $CH_3$;

W is —$CH_3$ or ($CH_2$=C(—X)—C(=O)—); and n is such that the weight average molecular weight is approximately 600–1000 if W is —$CH_3$ and approximately 400–1000 if W is ($CH_2$=C(—X)—C(=O)—).

14 Claims, No Drawings

HIGH REFRACTIVE INDEX OPHTHALMIC DEVICE MATERIALS

This application is a Continuation-in-Part of U.S. Ser. No. 09/283,671, filed Apr. 1, 1999, now abandoned which claims priority from co-pending U.S. Provisional Patent Application Ser. No. 60/081,814, filed Apr. 15, 1998.

FIELD OF THE INVENTION

This invention relates to high refractive index polymers and their use in ophthalmic lenses, particularly intraocular lenses that can be inserted through small incisions.

BACKGROUND OF THE INVENTION

In response to the development of cataractous lenses, it has become common to replace the lens with an artificial intraocular lens (IOL) in a surgical procedure. In order to reduce the trauma to the eye in cataract surgery, it is desirable to keep the incision through which the surgical procedure is conducted as small as possible. With the development of phacoemulsification surgery, in which the lens is fragmented by ultrasonic vibrations and the fragments aspirated through a small cannula, it has become possible to remove a lens through an incision no larger than 2–4 millimeters. However, since an IOL is typically at least five to six millimeters in diameter, an incision at least that large has to be made to permit the insertion of the IOL. In order to permit the use of the desirable small incision technique, various flexible, distortable, and inflatable IOLs have been devised.

Juergens, U.S. Pat. No. 4,619,662, discloses a collapsible intraocular lens with a hollow interior which can be evacuated to cause the lens to collapse to a relatively small size. The collapsed lens can then be inserted into the eye through a relatively small incision. After insertion, the interior of the lens is filled with an elastomer to expand the lens to the proper shape and dimension.

Mazzocco, U.S. Pat. No. 4,573,998, discloses a deformable intraocular lens that can be rolled, folded, or stretched to fit through a relatively small incision. The deformable lens is inserted while it is held in its distorted configuration, then released inside the chamber of the eye, whereupon the elastic property of the lens causes it to resume its molded shape. As suitable materials for the deformable lens, Mazzocco discloses polyurethane elastomers, silicone elastomers, hydrogel polymer compounds, organic or synthetic gel compounds and combinations thereof.

Keates et al., U.S. Pat. No. 4,619,657, disclose a flexible intraocular lens holder made from a flexible inert polymer, such as silicone rubber, which contains pockets for receiving individual lenses which are small enough to fit through a relatively small incision. The lens holder is folded or rolled and inserted through a small incision and thereafter several of the small lenses are inserted through the incision and into the pockets in the lens holder to form a composite intraocular lens.

A number of these known methods of providing an intraocular lens which can be inserted through a small incision have suffered from the excessive complexity of inflatable lenses or composite lenses. The deformable intraocular lenses are simpler to manufacture and use; however, when they are made of low refractive index materials, such as polyurethane elastomers and silicone elastomers, they must be relatively thick in order to provide a lens of the proper refractive power. The thicker the lens, the more difficult it is to deform or distort it into a shape which will fit through a small incision. Furthermore, the distortion required to force a thick lens through a small incision may exceed its elastic properties so that it breaks or will not recover its original shape when released within the eye. Therefore, lenses made from such materials are somewhat limited as to the minimum size to which they may be deformed.

Accordingly, recent efforts have focused on materials which can be used to form a flexible intraocular lens that can be simply rolled or folded into a configuration which will fit through a small incision. For example, U.S. Pat. No. 5,331,073 discloses foldable intraocular lens materials. The copolymeric materials disclosed in U.S. Pat. No. 5,331,073 optionally contain a hydrophilic monomer present in an amount sufficient to reduce the tackiness of the copolymer relative to a substantially identical copolymer lacking the hydrophilic monomer. Additionally, U.S. Pat. No. 5,290,892 discloses high refractive index acrylic materials which are foldable and thus capable of being inserted through small incisions.

In some cases, foldable acrylic intraocular lenses develop "glistenings" when implanted in humans or soaked in water at physiological temperatures. These microvacuoles appear to be pockets of water approximately 1 μm or greater in diameter. These glistenings are often too small to be seen by the naked eye, but are sometimes observed using a slit-lamp. Although glistenings have no detrimental effect on the function or performance of IOLs made from acrylic materials, it is nevertheless cosmetically desirable to minimize or eliminate them.

PCT Publication No. WO 97/24382 discloses a foldable intraocular lens material containing 2-phenylethylacrylate, 2-phenylethylmethacyrlate, and 0.1 to 10 mole % of a "third monomer of recognized hydrophilic character." The hydrophilic monomer is intended to reduce the risk of glistenings. Suitable hydrophilic monomers include "monomers such as acrylic acid, methacrylic acid, hydroxyethylacrylate, hydroxyethylmethacrylate, acrylamide, methacrylamide, poly(ethylene glycol)acrylates (PEG-acrylates) and other similar monomers (preferably unsaturated compounds), especially those containing carboxyl-, hydroxyl-, sulphate, sulphonate-, amido or substituted amino-bearing groups, known to those skilled in the art of polymer chemistry."

It is desirable for a number of reasons to limit the total amount of hydrophilic monomer to low amounts. For example, hydrophilic ingredients compromise the high refractive index of aryl acrylic hydrophobic materials because the hydrophilic ingredients themselves possess lower refractive indices and because the water taken up by the resulting material lowers the overall refractive index of the material. Despite the broad disclosure of suitable hydrophilic monomers in WO 97/24382, most are unable to eliminate glistenings when present at concentrations below 10 mole %.

SUMMARY OF THE INVENTION

This invention is directed to ophthalmic devices comprising high refractive index copolymers comprising a) two or more monomers of the structure:

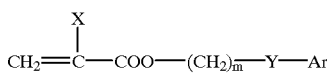

(I)

wherein: X is H or CH$_3$;

m is 0–10;

Y is nothing, O, S, or NR wherein R is H, CH$_3$, C$_n$H$_{2n+1}$(n=1–10), iso-OC$_3$H$_7$, C$_6$H$_5$, or CH$_2$C$_6$H$_5$; and Ar is any aromatic ring which can be unsubstituted or substituted with CH$_3$, C$_2$H$_5$, n-C$_3$H$_7$, iso-C$_3$H$_7$, OCH$_3$, C$_6$H$_{11}$, Cl, Br, C$_6$H$_5$, or CH$_2$C$_6$H$_5$; and b) a total of approximately 5 mole % or less of one or more monomers of the structure:

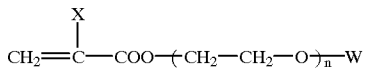

(II)

wherein: X is H or CH$_3$;

W is —CH$_3$ or (CH$_2$=C(—X)—C(=O)—); and n is such that the weight average molecular weight is approximately 600–1000 if W is —CH$_3$ and approximately 400–1000 if W is (CH$_2$=C(—X)—C(=O)—).

These copolymers can be used to form intraocular lenses that have high refractive indexes, are flexible and transparent, can be inserted into the eye through a relatively small incision, and recover their original shape after having been inserted. Moreover, IOLs made from these copolymers are free of glistenings compared to otherwise identical copolymers lacking a monomer of structure (II).

DETAILED DESCRIPTION OF THE INVENTION

The high refractive index copolymers used in preparing the ophthalmic devices of the present invention comprise a) two or more monomers of the structure:

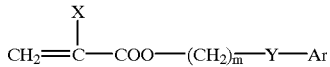

(I)

wherein: X is H or CH$_3$;

m is 0–10;

Y is nothing, O, S, or NR wherein R is H, CH$_3$, C$_n$H$_{2n+1}$(n=1–10), iso-OC$_3$H$_7$, C$_6$H$_5$, or CH$_2$C$_6$H$_5$;

Ar is any aromatic ring which can be unsubstituted or substituted with CH$_3$, C$_2$H$_5$, n-C$_3$H$_7$, iso-C$_3$H$_7$, OCH$_3$, C$_6$H$_{11}$, Cl, Br, C$_6$H$_5$, or CH$_2$C$_6$H$_5$;

Suitable monomers of structure (I) include, but are not limited to: 2-ethylphenoxy methacrylate; 2-ethylphenoxy acrylate; 2-ethylthiophenyl methacrylate; 2-ethylthiophenyl acrylate; 2-ethylaminophenyl methacrylate; 2-ethylaminophenyl acrylate; phenyl methacrylate; phenyl acrylate; benzyl methacrylate; benzyl acrylate; 2-phenylethyl methacrylate; 2-phenylethyl acrylate; 3-phenylpropyl methacrylate; 3-phenylpropyl acrylate; 4-phenylbutyl methacrylate; 4-phenylbutyl acrylate; 4-methylphenyl methacrylate; 4-methylphenyl acrylate; 4-methylbenzyl methacrylate; 4-methylbenzyl acrylate; 2-2-methylphenylethyl methacrylate; 2-2-methylphenylethyl acrylate; 2-3-methylphenylethyl methacrylate; 2-3-methylphenylethyl acrylate; 24-methylphenylethyl methacrylate; 2-4-methylphenylethyl acrylate; 2-(4-propylphenyl)ethyl methacrylate; 2-(4-propylphenyl)ethyl acrylate; 2-(4-(1-methylethyl)phenyl)ethyl methacrylate; 2-(4-(1-methylethyl)phenyl)ethyl acrylate; 2-(4-methoxyphenyl)ethyl methacrylate; 2-(4-methoxyphenyl)ethyl acrylate; 2-(4-cyclohexylphenyl)ethyl methacrylate; 2-(4-cyclohexylphenyl)ethyl acrylate; 2-(2-chlorophenyl)ethyl methacrylate; 2-(2-chlorophenyl)ethyl acrylate; 2-(3-chlorophenyl)ethyl methacrylate; 2-(3-chlorophenyl)ethyl acrylate; 2-(4-chlorophenyl)ethyl methacrylate; 2-(4-chlorophenyl)ethyl acrylate; 2-(4-bromophenyl)ethyl methacrylate; 2-(4-bromophenyl)ethyl acrylate; 2-(3-phenylphenyl)ethyl methacrylate; 2-(3-phenylphenyl)ethyl acrlate; 2-(4-phenylphenyl)ethyl methacrylate; 2-(4-phenylphenyl)ethyl acrylate; 2-(4-benzylphenyl)ethyl methacrylate; and 2-(4-benzylphenyl)ethyl acrylate, and the like.

Preferred monomers of structure (I) are those wherein m is 2–4, Y is nothing or O, and Ar is phenyl. Most preferred are 2-phenylethyl acrylate and 2-phenylethyl methacrylate.

The total amount of the monomers of structure (I) contained in the copolymers of the present invention is generally about 80% by weight or more, and is preferably about 80–90% by weight.

In addition to two or more monomers of structure (I), the copolymers of the present invention also contain a total of approximately 5 mole % or less of one or more monomers of the structure:

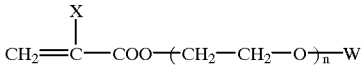

(II)

wherein: X is H or CH$_3$;

W is —CH$_3$ or (CH$_2$=C(—X)—C(=O)—); and n is such that the weight average molecular weight is approximately 600–1000 if W is —CH$_3$ and approximately 400–1000 if W is (CH$_2$=C(—X)—C(=O)—).

The monomers of structure (II) are commercially available or can be synthesized using known methods. Representative monomers of structure (II) include polyethylene oxide monomethylether monomethacrylate having a weight average molecular weight of approximately 1000; and polyethylene oxide dimethacrylate having a weight average molecular weight of approximately 400; polyethylene oxide dimethacrylate having a weight average molecular weight of approximately 600; and polyethylene oxide dimethacrylate having a weight average molecular weight of approximately 1000.

The amount of monomer of structure (II) is less than about 5 mole %, which generally corresponds to about 15–30 weight %, depending upon the choice of X, W and n.

In the case of the monomers of structure (II) where W is (CH$_2$=C(—X)—C(=O)—), no separate cross-linking agent is required because such monomers themselves act as cross-linking agents. Additional cross-linking agents are nevertheless optionally included in the compositions of the present invention in such a case. In the case where the monomer(s) of structure (II) are chosen so that W is CH$_3$, a separate cross-linking agent is required. The copolymerizable cross-linking agent used in the copolymers of this invention may be any terminally ethylenically unsaturated compound having more than one unsaturated group. Suitable cross-linking agents include, for example: ethylene glycol dimethacrylate, diethylene glycol dimethacrylate, allyl methacrylate, 1,3-propanediol dimethacrylate, allyl methacrylate, 1,6-hexanediol dimethacrylate, 1,4-butanediol dimethacrylate, and the like. Preferred cross-linking agents are ethylene glycol dimethacrylate (EGDMA) and 1,4-butanediol diacrylate (BDDA). In general, the amount of any cross-linking agent (other than those of structure (II)) utilized in the copolymers of the present invention will be about 10% (w/w) or less.

It will be understood by those skilled in the art, that among polymers of acrylic esters, those made from acrylate ester monomers tend to have lower glass transition temperatures and to be more flexible than polymers of methacrylate esters. Accordingly, the aryl acrylate/methacrylate copolymers used in the devices of this invention will generally comprise a greater weight percent of acrylate ester than of methacrylate ester. It is preferred that the aryl acrylate monomers constitute from about 50 weight percent to about 95 weight percent of the polymer, while the aryl methacrylate monomers constitute from about 5 weight percent to about 40 weight percent of the polymer.

The proportions of the monomers to be included in the copolymers of the present invention should be chosen so that the copolymer has a glass transition temperature ($T_g$) not greater than about 37° C., which is normal human body temperature. Copolymers having glass transition temperatures higher than 37° C. are not suitable for use in foldable IOLs; such lenses could only be rolled or folded at temperatures above 37° C. and would not unroll or unfold at normal body temperature. It is preferred to use copolymers having a glass transition temperature somewhat below normal body temperature and no greater than normal room temperature, e.g., about 20–25° C., in order that IOLs made of such copolymers can be rolled or folded conveniently at room temperature. $T_g$ is measured by differential scanning calorimetry at 10° C./min., and is determined at the midpoint of the transition of the heat flux curve.

For IOLs and other applications, the materials of the present invention must exhibit sufficient strength to allow devices made of them to be folded or manipulated without fracturing. Thus the copolymers of the present invention will have an elongation of at least 150%, preferably at least 200%, and most preferably between 300 and 600%. This property indicates that lenses made of such materials generally will not crack, tear or split when folded. Elongation of polymer samples is determined on dumbbell shaped tension test specimens with a 20 mm total length, length in the grip area of 4.88 mm, overall width of 2.49 mm, 0.833 mm width of the narrow section, a fillet radius of 8.83 mm, and a thickness of 0.9 mm. Testing is performed on samples at ambient conditions using an Instron Material Tester (Model No. 4442 or equivalent) with a 50 Netwon load cell. The grip distance is set at 14 mm and a crosshead speed is set at 500 mm/minute and the sample is pulled until failure. The elongation (strain) is reported as a fraction of the displacement at failure to the original grip distance.

IOLs made of the copolymers of the present invention are free of glistenings when measured according to the following test. The presence of glistenings is measured by placement of a lens sample into a vial and adding deionized water or a balanced salt solution. The vial is then placed into a water bath preheated to 45° C. Samples are to be maintained in the bath for 24 hours. The sample is then placed either in a 37° C. bath or at room temperature and allowed to equilibrate for 2 hours. The sample is removed from the vial and placed on a microscope slide. Visualization of glistenings is done with light microscopy using a magnification of 50 to 200×. A sample is judged to be free of glistenings if, at 50–200× magnification, the number of glistenings detected in the eyepiece is zero. It is often very difficult to detect glistenings at lower magnification levels (e.g., 50×), so the sample is rastered throughout the entire volume of the lens with higher magnification levels (up to 200×) in an attempt to detect the presence of glistenings.

The copolymers of this invention are prepared by conventional polymerization methods. A mixture of the liquid monomers in the desired proportions together with a conventional thermal free-radical initiator is prepared. The mixture can then be introduced into a mold of desired shape, and the polymerization carried out by heating to activate the initiator. Typical thermal free radical initiators include peroxides, such as benzophenone peroxide, peroxycarbonates, such as bis-(4-t-butulcyclohexyl) peroxydicarbonate, azonitriles, such as azobisisobytyronitrile, and the like. A preferred initiator is bis-(4-t-butylcyclohexyl) peroxydicarbonate (PERK). Alternatively, the monomers can be photopolymerized by using a mold which is transparent to actinic radiation of a wavelength capable of initiating polymerization of these acrylic monomers by itself. Conventional photoinitiator compounds, e.g., a benzophenone-type photoinitiator, can also be introduced to facilitate the polymerization. Photosensitizers can be introduced as well to permit the use of longer wavelengths; however, in preparing a polymer which is intended for long residence within the eye, it is generally preferable to keep the number of ingredients in the polymer to a minimum to avoid the presence of materials which might leach from an IOL into the interior of the eye.

An ultra-violet absorbing material can also be included in the materials of the present invention. The ultraviolet absorbing material can be any compound which absorbs ultraviolet light, i.e., light having a wavelength shorter than about 400 nm, but does not absorb any substantial amount of visible light. The ultraviolet absorbing compound is incorporated into the monomer mixture and is entrapped in the polymer matrix when the monomer mixture is polymerized. Suitable ultraviolet absorbing compounds include substituted benzophenones, such as 2-hydroxybenzophenone, and 2-(2-hydroxyphenyl)benzotriazoles. It is preferred to use an ultraviolet absorbing compound which is copolymerizable with the monomers and is thereby covalently bound to the polymer matrix. In this way possible leaching of the ultraviolet absorbing compound out of the lens and into the interior of the eye is minimized. Suitable copolymerizable ultraviolet absorbing compounds are the substituted 2-hydroxybenzophenones disclosed in U.S. Pat. No. 4,304,895 and the 2-hydroxy-5-acryloxyphenyl-2H-benzotriazoles disclosed in U.S. Pat. No. 4,528,311. The most preferred ultraviolet absorbing compound is 2-(2'-hydroxy-3'-methallyl-5'-methyl phenyl) benzotriazole.

In addition to ultraviolet absorbing materials, ophthalmic devices made of the copolymers of the present invention may include colored dyes, such as the yellow dyes disclosed in U.S. Pat. No. 5,470,932.

IOLs constructed of the disclosed polymers can be of any design capable of being rolled or folded into a small cross section that can fit through a relatively smaller incision. For example, the IOLs can be of what is known as a one piece or multipiece design. Typically, an IOL comprises an optic and at least one haptic. The optic is that portion which serves as the lens and the haptics are attached to the optic and are like arms which hold the optic in its proper place in the eye. The optic and haptic(s) can be of the same or different material. A multipiece lens is so called because the optic and the haptic(s) are made separately and then the haptics are attached to the optic. In a single piece lens, the optic and the haptics are formed out of one piece of material. Depending on the material, the haptics are then cut, or lathed, out of the material to produce the IOL.

Molding and drilling operations are easily carried out if the optic is molded between two polypropylene mold halves. The mold containing the cured optic material is then placed on a lathe and the desired optic diameter is lathe cut. The resultant optic/mold sandwich may be easily mounted to carry out any drilling operations prior to removing the mold halves. Both the lathing and drilling operations may be facilitated by cooling the mold/optic in a freezer to less than 10° C. and preferably less than 0° C. prior to each of these operations. Many methods of attaching a haptic to the optic are known. See, for example, U.S. Pat. No. 5,118,452.

In addition to IOLs, the materials of the present invention are also suitable for use as other ophthalmic devices such as contact lenses, keratoprostheses, intracorneal lenses, corneal inlays or rings, and glaucoma filtration devices.

The invention will be further illustrated by the following examples which are intended to be illustrative, but not limiting.

EXAMPLE 1

The copolymers listed below in Tables 1–3 were prepared by mixing the indicated ingredients to yield a liquid formulation that was then cast into a mold and thermally cured in air-circulating ovens. All values in Tables 1–3 are listed in mole %. Optic molds were used to produce samples for the glistening test described above and slab molds (12×25×1 mm) were used to produce samples for the elongation test described above. In addition to the ingredients listed below, each of the copolymers shown in Tables 1 and 2 contained approximately 2% (w/w) of 1,4-butanediol diacrylate as a cross-linking agent, 1% (w/w) of o-Methyl Tinuvin P as an UV-absorbing chromophore, and 1% (w/w) of Perkadox-16 as a polymerization initiator. The results of the glistening and elongation tests are shown in Table 4. The glistening results are reported as yes ("Y"—meaning glistenings were detected) or no ("N"—meaning glistenings were not detected).

TABLE 1

| SAMPLE | PEA | PEMA | NVP | GMA | HEA | HEMA |
|---|---|---|---|---|---|---|
| 1. | 74.1 | 15.6 | 7.9 | | | |
| 2. | 71.8 | 10.6 | 15.3 | | | |
| 3. | 69.5 | 6.0 | 22.3 | | | |
| 4. | 76.0 | 15.9 | | 5.7 | | |
| 5. | 75.3 | 11.1 | | 11.1 | | |
| 6. | 74.6 | 6.4 | | 16.6 | | |
| 7. | 74.4 | 15.6 | | | 7.6 | |
| 8. | 72.2 | 10.7 | | | 14.8 | |
| 9. | 70.1 | 6.1 | | | 21.6 | |
| 10. | 76.2 | 16.0 | | | | 5.3 |
| 11. | 75.8 | 11.2 | | | | 10.6 |
| 12. | 75.3 | 6.5 | | | | 15.8 |

PEA = 2-phenylethyl acrylate
PEMA = 2-phenylethyl methacrylate
NVP = N-vinyl pyrrolidone
GMA = 2,3-dihydroxypropyl methacrylate (glycerol monomethacrylate)
HEA = 2-hydroxyethyl acrylate
HEMA = 2-hydroxyethyl methacrylate

TABLE 2

| SAMPLE | PEA | PEMA | P200MMA | P200MA | P400MMA | P400MA | P1000MMA |
|---|---|---|---|---|---|---|---|
| 13. | 79.8 | 16.8 | | | | | 0.9 |
| 14. | 83.2 | 12.3 | | | | | 1.8 |
| 15. | 86.9 | 7.5 | | | | | 2.8 |
| 16. | 78.0 | 16.4 | 3.1 | | | | |
| 17. | 79.4 | 11.8 | 6.3 | | | | |
| 18. | 80.8 | 7.0 | 9.6 | | | | |
| 19. | 78.13 | 16.40 | 2.49 | | | | |
| 20. | 80.07 | 11.86 | 5.18 | | | | |
| 21. | 82.19 | 7.11 | 7.90 | | | | |
| 22. | 77.98 | 16.37 | | 2.68 | | | |
| 23. | 79.87 | 11.83 | | 5.42 | | | |
| 24. | 81.87 | 7.08 | | 8.26 | | | |
| 25. | 78.89 | 16.56 | | | 1.54 | | |
| 26. | 81.76 | 12.11 | | | 3.18 | | |
| 27. | 84.87 | 7.34 | | | 4.90 | | |
| 28. | 78.85 | 16.55 | | | | 1.59 | |
| 29. | 81.68 | 12.10 | | | | 3.27 | |
| 30. | 84.75 | 7.33 | | | | 5.03 | |
| 31. | 79.57 | 16.70 | | | | | 0.70 |
| 32. | 83.21 | 12.33 | | | | | 1.46 |
| 33. | 87.20 | 7.54 | | | | | 2.29 |

P200MMA = polyethylene oxide (weight avg. M.W. of 200) monomethylether monomethacrylate
P200MA = polyethylene oxide (weight avg. M.W. of 200) monomethacrylate
P400MMA = polyethylene oxide (weight avg. M.W. of 400) monomethylether monomethacrylate
P400MA = polyethylene oxide (weight avg. M.W. of 400) monomethacrylate
P1000MMA = polyethylene oxide (weight avg. M.W. of 1000) monomethylether monomethacrylate

TABLE 3

| SAMPLE | PEA | PEMA | P200DMA | P400DMA | P600DMA | P1000DMA |
|---|---|---|---|---|---|---|
| 34. | 79.9 | 16.8 | | | | 0.8 |
| 35. | 83.3 | 12.3 | | | | 1.7 |
| 36. | 87.0 | 7.5 | | | | 2.7 |
| 37. | 78.5 | 16.5 | 2.5 | | | |
| 38. | 80.4 | 11.9 | 5.2 | | | |
| 39. | 82.3 | 7.1 | 7.9 | | | |
| 40. | 78.47 | 16.47 | 2.07 | | | |
| 41. | 80.88 | 11.98 | 4.22 | | | |
| 42. | 83.45 | 7.21 | 6.49 | | | |
| 43. | 79.04 | 16.59 | | 1.36 | | |
| 44. | 82.09 | 12.16 | | 2.79 | | |
| 45. | 85.39 | 7.38 | | 4.31 | | |
| 46. | 79.33 | 16.65 | | | 1.00 | |
| 47. | 82.69 | 12.25 | | | 2.08 | |
| 48. | 86.36 | 7.47 | | | 3.23 | |
| 49. | 79.60 | 16.71 | | | | 0.67 |
| 50. | 83.28 | 12.34 | | | | 1.38 |
| 51. | 87.32 | 7.55 | | | | 2.15 |

P200DMA = polyethylene oxide (weight avg. M.W. of 200) dimethacrylate
P400DMA = polyethylene oxide (weight avg. M.W. of 400) dimethacrylate
P600DMA = polyethylene oxide (weight avg. M.W. of 600) dimethacrylate
P1000DMA = polyethylene oxide (weight avg. M.W. of 1000) dimethacrytate

TABLE 4

| SAMPLE | GLISTENING (Y/N) | ELONGATION (%) |
|---|---|---|
| 1. | Y | 643 |
| 2. | Y | 558 |
| 3. | Y | 461 |
| 4. | Y | 648 |
| 5. | N | 577 |
| 6. | Y | 508 |
| 7. | Y | 718 |
| 8. | Y | 757 |
| 9. | Y | 822 |
| 10. | Y | 663 |
| 11. | Y | 671 |
| 12. | N | 448 |
| 13. | N | 635 |
| 14. | N | 517 |
| 15. | N | 266 |
| 16. | Y | 651 |
| 17. | Y | 562 |
| 18. | Y | 480 |
| 19. | Y | 694 |
| 20. | Y | 500 |
| 21. | Y | 472 |
| 22. | Y | 690 |
| 23. | Y | 545 |
| 24. | Y | 431 |
| 25. | Y | 619 |
| 26. | Y | 513 |
| 27. | Y | 407 |
| 28. | Y | 692 |
| 29. | Y | 506 |
| 30. | Y | 387 |
| 31. | Y | 656 |
| 32. | N | 503 |
| 33. | N | 396 |
| 34. | Y | 548 |
| 35. | N | 355 |
| 36. | N | 266 |
| 37. | Y | 413 |
| 38. | Y | 338 |
| 39. | Y | 250 |
| 40. | Y | 403 |
| 41. | Y | 346 |
| 42. | N | 309 |
| 43. | Y | 467 |
| 44. | N | 358 |
| 45. | N | 284 |
| 46. | Y | 516 |
| 47. | Y | 381 |
| 48. | N | 243 |
| 49. | Y | 540 |
| 50. | N | 383 |
| 51. | N | 278 |

The invention having now been fully described, it should be understood that it may be embodied in other specific forms or variations without departing from its spirit or essential characteristics. Accordingly, the embodiments described above are to be considered in all respects as illustrative and not restrictive, the scope of the invention being indicated by the appended claims rather than by the foregoing description, and all changes which come within the meaning and range of equivalency of the claims are intended to be embraced therein.

We claim:

1. In an ophthalmic device comprising a high refractive index copolymer having a glass transition temperature less than about 37° C. and an elongation of at least 150%, wherein the copolymer comprises a) two or more monomers of the structure:

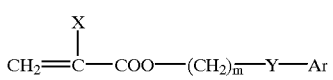

(I)

wherein: X is H or $CH_3$;
m is 0–10;
Y is nothing, O, S, or NR wherein R is H, $CH_3$, $C_nH_{2n+1}$(n=1–10), iso-$OC_3H_7$, $C_6H_5$, or $CH_2C_6H_5$;
Ar is any aromatic ring which can be unsubstituted or substituted with $CH_3$, $C_2H_5$, n-$C_3H_7$, iso-$C_3H_7$, $OCH_3$, $C_6H_{11}$, Cl, Br, $C_6H_5$, or $CH_2C_6H_5$; and
b) a cross-linking monomer having a plurality of polymerizable ethylenically unsaturated groups, the improvement wherein the copolymer further comprises one or more compounds of the structure;

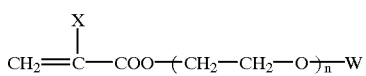
(II)

wherein: X is H or $CH_3$;
W is $CH_3$; and
n is such that the weight average molecular weight is approximately 600–1000, provided that the one or more compounds of structure (II) is present in an amount effective to eliminate glistenings from the copolymer and said amount is greater than 0.7 mole % but not greater than 5 mole %.

2. The ophthalmic device of claim 1 wherein the copolymer further comprises an ingredient selected from the group consisting of ultraviolet absorbing materials and yellow dyes.

3. The ophthalmic device of claim 1 wherein the monomers of structure (I) have m=2–4; Y=nothing or O; and Ar=phenyl.

4. The ophthalmic device of claim 1 wherein the monomers of structure (I) are selected from the group consisting of 2-ethylphenoxy methacrylate; 2-ethylphenoxy acrylate; 2-ethylthiophenyl methacrylate; 2-ethylthiophenyl acrylate; 2-ethylaminophenyl methacrylate; 2-ethylaminophenyl acrylate; phenyl methacrylate; phenyl acrylate; benzyl methacrylate; benzyl acrylate; 2-phenylethyl methacrylate; 2-phenylethyl acrylate; 3-phenylpropyl methacrylate; 3-phenylpropyl acrylate; 4-phenylbutyl methacrylate; 4-phenylbutyl acrylate; 4-methylphenyl methacrylate; 4-methylphenyl acrylate; 4-methylbenzyl methacrylate; 4-methylbenzyl acrylate; 2-2-methylphenylethyl methacrylate; 2-2-methylphenylethyl acrylate; 2-3-methylphenylethyl methacrylate; 2-3-methylphenylethyl acrylate; 24-methylphenylethyl methacrylate; 2-4-methylphenylethyl acrylate; 2-(4-propylphenyl)ethyl methacrylate; 2-(4-propylphenyl)ethyl acrylate; 2-(4-(1-methylethyl)phenyl)ethyl methacrylate; 2-(4-(1-methylethyl)phenyl)ethyl acrylate; 2-(4-methoxyphenyl)ethyl methacrylate; 2-(4-methoxyphenyl)ethyl acrylate; 2-(4-cyclohexylphenyl)ethyl methacrylate; 2-(4-cyclohexylphenyl)ethyl acrylate; 2-(2-chlorophenyl)ethyl methacrylate; 2-(2-chlorophenyl)ethyl acrylate; 2-(3-chlorophenyl)ethyl methacrylate; 2-(3-chlorophenyl)ethyl acrylate; 2-(4-chlorophenyl)ethyl methacrylate; 2-(4-chlorophenyl)ethyl acrylate; 2-(4-bromophenyl)ethyl methacrylate; 2-(4-bromophenyl)ethyl acrylate; 2-(3-phenylphenyl)ethyl methacrylate; 2-(3-phenylphenyl)ethyl acrylate; 2-(4-phenylphenyl)ethyl methacrylate; 2-(4-phenylphenyl)ethyl acrylate; 2-(4-benzylphenyl)ethyl methacrylate; and 2-(4-benzylphenyl)ethyl acrylate.

5. The ophthalmic device of claim 4 wherein the two or more monomers of structure (I) consist of 2-phenylethyl acrylate and 2-phenylethyl methacrylate.

6. The ophthalmic device of claim 1 wherein the compound of structure (II) is polyethylene oxide monomethylether monomethacrylate having a weight average molecular weight of approximately 1000.

7. The ophthalmic device of claim 1 wherein the device is selected from the group consisting of intraocular lenses; contact lenses; keratoprostheses; intracorneal lenses; corneal inlays; corneal rings; and glaucoma filtration devices.

8. In an ophthalmic device comprising a high refractive index copolymer having a glass transition temperature less than about 37° C. and an elongation of at least 150%, wherein the copolymer comprises a) two or more monomers of the structure:

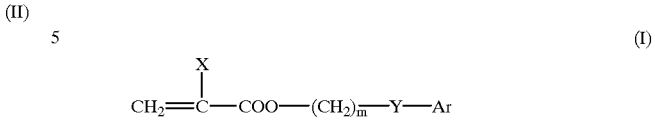
(I)

wherein: X is H or $CH_3$;
m is 0–10;
Y is nothing, O, S, or NR wherein R is H, $CH_3$, $C_nH_{2n+1}$ (n=1–10), iso-$OC_3H_7$, $C_6H_5$, or $CH_2C_6H_5$;
Ar is any aromatic ring which can be unsubstituted or substituted with $CH_3$, $C_2H_5$, n-$C_3H_7$, iso-$C_3H_7$, $OCH_3$, $C_6H_{11}$, Cl, Br, $C_6H_5$, or $CH_2C_6H_5$; and
b) a cross-linking monomer having a plurality of polymerizable ethylenically unsaturated groups,
the improvement wherein the cross-linking monomer consists of one or more compounds of the structure:

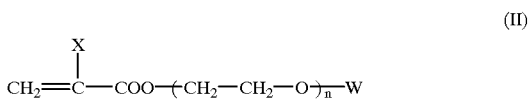
(II)

wherein: X is H or $CH_3$;
W is $(CH_2=C(-X)-C(=O)-)$; and
n is such that the weight average molecular weight is approximately 400–1000, provided that the one or more compounds of structure (II) is present in an amount effective to eliminate glistenings from the copolymer and said amount is not less than 1.7 mole % but not greater than 5 mole %.

9. The ophthalmic device of claim 8 wherein the copolymer further comprises an ingredient selected from the group consisting of ultraviolet absorbing materials and yellow dyes.

10. The ophthalmic device of claim 9 wherein the monomers of structure (I) have m=2–4; Y=nothing or O; and Ar=phenyl.

11. The ophthalmic device of claim 8 wherein the monomers of structure (I) are selected from the group consisting of 2-ethylphenoxy methacrylate; 2-ethylphenoxy acrylate; 2-ethylthiophenyl methacrylate; 2-ethylthiophenyl acrylate; 2-ethylaminophenyl methacrylate; 2-ethylaminophenyl acrylate; phenyl methacrylate; phenyl acrylate; benzyl methacrylate; benzyl acrylate; 2-phenylethyl methacrylate; 2-phenylethyl acrylate; 3-phenylpropyl methacrylate; 3-phenylpropyl acrylate; 4-phenylbutyl methacrylate; 4-phenylbutyl acrylate; 4-methylphenyl methacrylate; 4-methylphenyl acrylate; 4-methylbenzyl methacrylate; 4-methylbenzyl acrylate; 2-2-methylphenylethyl methacrylate; 2-2-methylphenylethyl acrylate; 2-3-methylphenylethyl methacrylate; 2-3-methylphenylethyl acrylate; 2-4-methylphenylethyl methacrylate; 2-4-methylphenylethyl acrylate; 2-(4-propylphenyl)ethyl methacrylate; 2-(4-propylphenyl)ethyl acrylate; 2-(4-(1-methylethyl)phenyl)ethyl methacrylate; 2-(4-(1-methylethyl)phenyl)ethyl acrylate; 2-(4-methoxyphenyl) ethyl methacrylate; 2-(4-methoxyphenyl)ethyl acrylate; 2-(4-cyclohexylphenyl)ethyl methacrylate; 2-(4-cyclohexylphenyl)ethyl acrylate; 2-(2-chlorophenyl)ethyl methacrylate; 2-(2-chlorophenyl)ethyl acrylate; 2-(3-chlorophenyl)ethyl methacrylate; 2-(3-chlorophenyl)ethyl acrylate; 2-(4-chlorophenyl)ethyl methacrylate; 2-(4- chlorophenyl)ethyl acrylate; 2-(4-bromophenyl)ethyl methacrylate; 2-(4-bromophenyl)ethyl acrylate; 2-(3-phenylphenyl)ethyl methacrylate; 2-(3-phenylphenyl)ethy acrylate; 2-(4-phenylphenyl)ethyl methacrylate; 2-(4-phenylphenyl)ethyl acrylate; 2-(4-benzylphenyl)ethyl methacrylate; and 2-(4-benzylphenyl)ethyl acrylate.

12. The ophthalmic device of claim 11 wherein the two or more monomers of structure (I) consist of 2-phenylethyl acrylate and 2-phenylethyl methacrylate.

13. The ophthalmic device of claim 8 wherein the monomer of structure (II) is selected from the group consisting of polyethylene oxide dimethacrylate having a weight average molecular weight of approximately 400; polyethylene oxide dimethacrylate having a weight average molecular weight of approximately 600; and polyethylene oxide dimethacrylate having a weight average molecular weight of approximately 1000.

14. The ophthalmic device of claim 8 wherein the device is selected from the group consisting of intraocular lenses; contact lenses; keratoprostheses; intracorneal lenses; corneal inlays; corneal rings; and glaucoma filtration devices.

* * * * *